Dec. 1, 1970     L. J. GALLO     3,543,546
AUTOMOBILE DOOR SAFETY LOCK
Filed Oct. 18, 1968     2 Sheets-Sheet 1
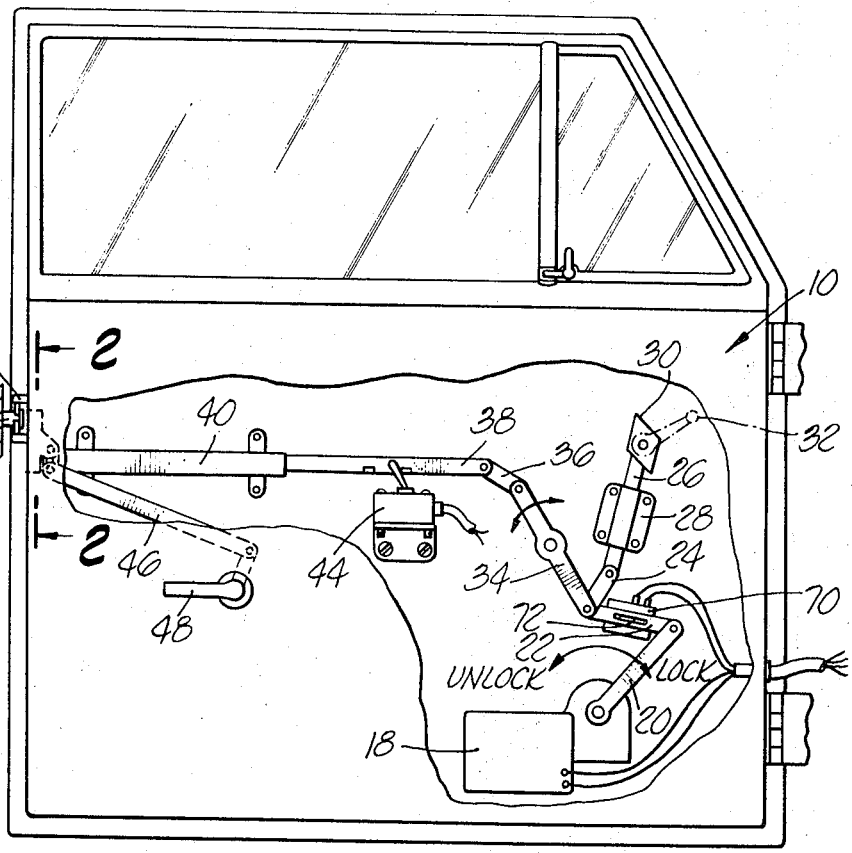
FIG. 1.
FIG. 2.
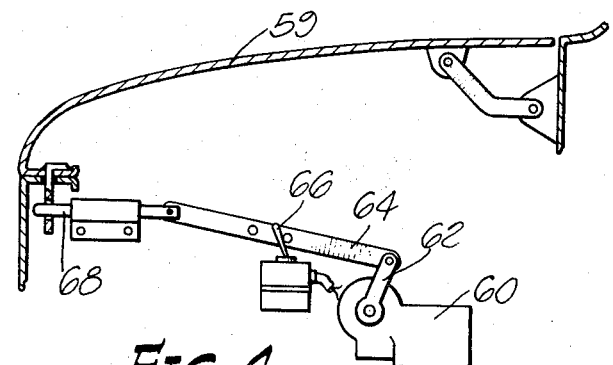
FIG. 4.
FIG. 5.
INVENTOR
LOUIS J. GALLO
BY
Lyon & Lyon
ATTORNEYS

United States Patent Office 3,543,546
Patented Dec. 1, 1970

3,543,546
AUTOMOBILE DOOR SAFETY LOCK
Louis J. Gallo, 4779 Randall Drive,
Las Vegas, Nev. 89109
Filed Oct. 18, 1968, Ser. No. 768,837
Int. Cl. E05b 53/00, 65/19, 65/36
U.S. Cl. 70—264    4 Claims

ABSTRACT OF THE DISCLOSURE

This patent describes a device adapted to provide an automobile ignition, door and window safety lock and adapted for incorporation with the electrical circuit of the automobile ignition system, the automobile door lock and the operating mechanism for the window which ignition system has an electrical circuit connecting the ignition switch inside of the automobile with the battery and starting motor, the door lock comprises two counter-rotating members on the edge of the door which are adapted to receive a cooperating fixed engaging member on the striker plate of the door jam, and which automobile window is controlled by the turning of a rod or shaft, the present invention being characterized by a switch in circuit with the ignition system said switch being activated by an electro-motor which moves a system of levers, said system of levers moving a pin which causes interference with the rotation of the counter-rotating members of said door lock and said levers also having a portion moving into and out of contact with the rod or shaft for the window.

BACKGROUND OF THE INVENTION

This invention is adapted to provide a safety lock for the ignition, door and window of a motor vehicle controlled entirely by the door locking key in which the ignition, door and window may be locked and after which the ignition switch cannot be forced or "jumped," and the door or window cannot be unlocked by turning any of the conventional handles even to the breaking point. The entire unlocking feature of the present invention is under the control of electrically driven mechanism dependent solely upon the proper turning of the key in the door lock or in some other position on the exterior of the car. Automobile theft or theft from automobiles is a serious modern problem. Various solutions for more securely locking the doors and windows have been suggested, but nearly all such devices can still be forced by applying a breaking or near breaking force to the handles or windows. The present invention, it is believed, represents a substantial advance in the art in that even in the case where the car is broken into by smashing of a window and reaching through or crawling through the broken window, the automobile still cannot be started and the doors cannot be opened without an appropriate key. It is, therefore, anticipated that the present invention will find wide application in the design of automobiles in the future.

SUMMARY OF THE INVENTION

This patent describes a device adapted to provide an automobile ignition, door and window safety lock adapted for incorporation with the electrical circuit of the automobile ignition system, the automobile door lock and the operating mechanism for the window which ignition system has an electrical circuit connecting the ignition switch inside of the automobile with the battery and starting motor, the door lock comprises two counter-rotating members on the edge of the door which are adapted to receive a cooperating fixed engaging member on the striker plate of the door jam, and which automobile window is controlled by the turning of a rod or shaft, the present invention being characterized by a switch in circuit with the ignition system said switch being activated by an electro-motor which moves a system of levers, said system of levers moving a pin which causes interference with the rotation of the counter-rotating members of said door lock and said levers also having a portion moving into and out of contact with the rod or shaft for the window.

Accordingly, it is a principal object of the present invention to provide a safety lock for the ignition, door and window of an automobile in which locking is secured independently of the handles by electrically operated devices under the sole control of a key.

A further object of the present invention is to provide a device in which the automobile ignition cannot be forced even if access to the interior of the car is somehow obtained.

These and other objects and advantages will be apparent from the more detailed description which follows taken in conjunction with the accompanying drawings.

DESCRIPTION OF PREFERRED EMBODIMENTS

Turning to the drawings:

FIG. 1 shows a side view of an automobile door carrying that portion of the locking device of the present invention normally installed in the door;

FIG. 2 is a view taken along the line 2—2 in FIG. 1;

Figure 3:
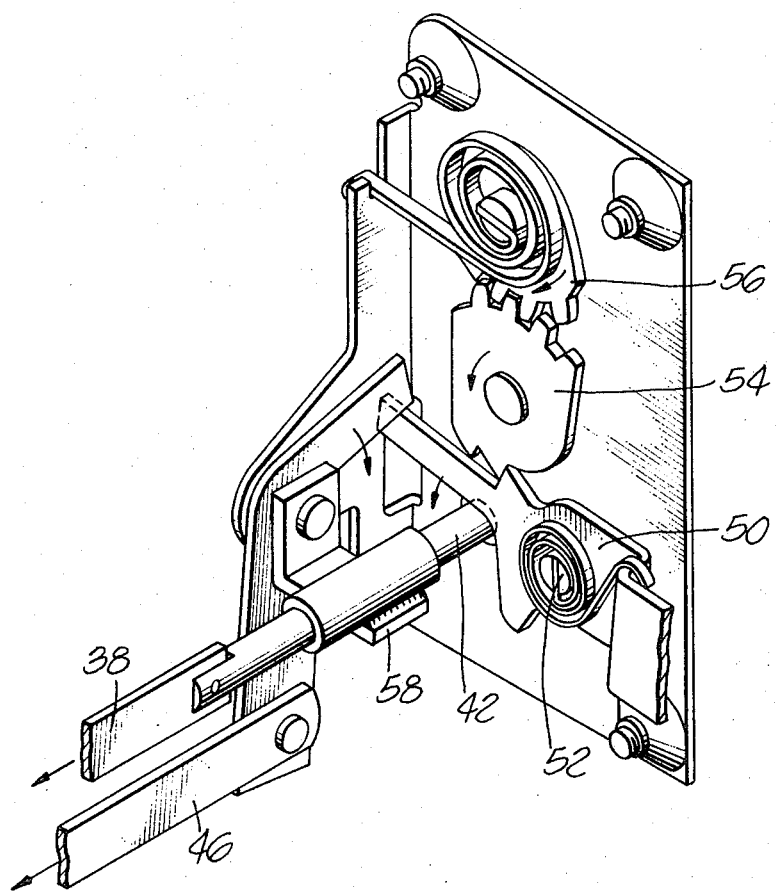
FIG. 3 is an enlarged perspective view of the door latch of FIG. 2 taken in conjunction with the shaft which is adapted to move into and out of said latch to prevent rotation of the two counter-rotating members.

FIG. 4 shows that portion of the present invention adapted to be installed in the hood or trunk of an automobile to prevent access thereto; and FIG. 5 shows a schematic drawing of the electrical circuitry of the present invention depicting the manner in which the present invention serves to also lock the ignition system of the automobile so that the automobile cannot be started without the appropriate key.

Discussing the drawings in greater detail, in FIG. 1 the door is shown generally at 10. The door is provided with an ordinary latch 12 on the exterior of the door jam. This latch is adapted to engage the projection 14 on the striker plate 16. Within the door there is provided electrical motor 18 which moves the lever 20 in the manner indicated. The lever 20 is connected to lever 22 which in turn is connected via lever 24 to lever 26 which is maintained in position by retainer 28. The end of lever 26 abuts the diamond-shaped attachment 30 on the window roll-down handle 32. The lever 22 also connects to lever 34. Lever 34 connects to lever 36 which in turn connects to lever 38 held by retainer 40. Lever 38 drives the pin 42 into and out of the position shown in FIG. 3. The lever 38 is also adapted to engage and operate the toggle switch 44 which is electrically connected with the ignition system of the automobile as depicted schematically in FIG. 5. The door latch 12 is also connected by lever 46 to inside door handle 48. By inserting the key in the door lock, the electrical motor 18 is made to rotate the lever 22 ot the locked position which results in lever 26 contacting the diamond member 30 so that the window cannot be rolled down. At the same time, lever 38 forces the toggle switch 44 to the open position so that the ignition system cannot be operated. Lever 38 moves the pin 42 into the position shown in FIG. 3 so that member 50 cannot be lowered by rotation about pivot 52 and instead engages counter-rotating member 54. When counter-rotating member 54 and complementary counter-rotating member 56 are not free to counter-rotate, it is impossible to open the car door. In general, the construction of the door latch is conventional except for the pin 42 and the supporting structure 58 therefor.

The locking device of the present invention can also be applied to the trunk and hood 59 as shown in FIG. 4 where the motor 60 operates through levers 62 and 64 to operate toggle switch 66 and the locking pin 68. All of the motors in the doors, hood and trunk can be operated by a single key in one of the doors or elsewhere on the exterior of the car. The appropriate wiring to permit the simultaneous operation of all of these motors will be apparent to those skilled in the art from the foregoing discussion.

In operation, the motors in the doors, hood and trunk are operated by the closing of a switch normally located in the keyhole of one of the doors, using the normal key. The motors drive the pins into the door locks so that the counter-rotating members cannot move, making it impossible to open the doors. At the same time, the levers prevent the lowering of the windows or the unlocking of any door by raising the inside door handle. The hood and trunk are also locked due to the pins which do not allow their being raised.

To unlock, the key is again inserted in the outside keyhole. The motors reverse and all of the pins are withdrawn, and the levers are moved away from the door and window handles. The motors are turned on and off at the forward and rearward movement of the levers by detector 70 which is operated by the forward and rearward ends of slot 72 in lever 22.

The present invention represents a major advance in the art. The device is essentially foolproof, simple and inexpensive to install, and completely effective in preventing car theft and theft of contents.

Having fully described the invention it is intended that it be limited only by the lawful scope of the appended claims.

I claim:

1. In an automobile having an ignition system, a door having a lock and an operating mechanism for the window, which ignition system has an electrical circuit connecting the ignition switch inside of the automobile with the battery and starting motor, the door lock comprises two counter-rotating members on the edge of the door which are adapted to receive a cooperating fixed engaging member on the striker plate of the door jam, and which automobile window is controlled by the turning of a rod or shaft, the improvement wherein there is a second switch in circuit with the ignition system, said second switch being opened by an electromotor to prevent operating of the starting motor by the inside ignition switch, said electro-motor being operably connected to a system of levers, said system of levers moving a pin which causes interference with the rotation of the counter-rotating members of said door lock and said levers also having a portion moving into and out of contact with said rod or shaft for the door window.

2. The device of claim 1 wherein the hood and trunk of the automobile are locked by a second pin, said pin being operated by a motor.

3. The device of claim 1 wherein said electro-motor is operated by a switch in the keyhole of a door, said switch being actuated by a conventional automobile key.

4. The device of claim 1 wherein every door is provided with said electro-motor, system of levers, and pin.

References Cited

UNITED STATES PATENTS

| 3,279,227 | 10/1966 | Kawabe | 70—264 |
| 3,359,767 | 12/1967 | Arlauskas et al. | 70—264 |

FOREIGN PATENTS

| 116,683 | 3/1943 | Australia. |
| 1,166,654 | 3/1964 | Germany. |

MARVIN A. CHAMPION, Primary Examiner

R. L. WOLFE, Assistant Examiner

U.S. Cl. X.R.

70—239, 241; 292—144